(12) United States Patent
Heitkamp et al.

(10) Patent No.: US 8,132,640 B2
(45) Date of Patent: Mar. 13, 2012

(54) FRANGIBLE MOUNT FOR A VEHICLE DIFFERENTIAL

(75) Inventors: Eric Heitkamp, Columbus, OH (US); Stephen Rosepiler, Marysville, OH (US); Kishore Pydimarry, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 260 days.

(21) Appl. No.: 12/505,948

(22) Filed: Jul. 20, 2009

(65) Prior Publication Data
US 2010/0032542 A1 Feb. 11, 2010

Related U.S. Application Data

(60) Provisional application No. 61/086,824, filed on Aug. 7, 2008.

(51) Int. Cl.
*B60K 17/24* (2006.01)

(52) U.S. Cl. ........ 180/379; 180/232; 180/274; 180/312; 180/378; 180/381; 248/560; 248/608; 248/662

(58) Field of Classification Search ............... 248/560, 248/608, 609, 652, 662, 664, 667, 669; 180/232, 180/274, 312, 376, 377, 378, 379, 381, 384, 180/360
See application file for complete search history.

(56) References Cited

U.S. PATENT DOCUMENTS

| | | | |
|---|---|---|---|
| 2,834,641 A * | 5/1958 | Mueller et al. ............... 384/536 |
| 3,718,304 A | 2/1973 | Schulz et al. |
| 3,860,258 A * | 1/1975 | Feustel et al. ................. 180/312 |
| 6,394,215 B1 * | 5/2002 | Masuda ......................... 180/232 |
| 6,435,299 B1 * | 8/2002 | Miller ........................... 180/381 |
| 6,557,874 B2 | 5/2003 | Fader |
| 6,766,877 B2 * | 7/2004 | Blumke et al. ................ 180/379 |
| 6,962,229 B2 | 11/2005 | Miyahara |
| 6,997,276 B2 | 2/2006 | Yoshida et al. |
| 7,040,446 B2 | 5/2006 | Anzai et al. |
| 7,175,532 B2 * | 2/2007 | Tapazoglou et al. .......... 464/183 |
| 7,510,163 B2 * | 3/2009 | Schlitzkus et al. ............ 248/635 |

FOREIGN PATENT DOCUMENTS

| | | |
|---|---|---|
| JP | 06173988 | 6/1994 |
| JP | 2002266917 | 9/2002 |
| JP | 2004019837 | 1/2004 |
| JP | 2004019838 | 1/2004 |

* cited by examiner

*Primary Examiner* — Terrell McKinnon
*Assistant Examiner* — Michael McDuffie
(74) *Attorney, Agent, or Firm* — Mark E. Duell; Rankin Hill & Clark LLP (57) ABSTRACT

A frangible mount for a vehicle differential that includes a first horizontal mounting flange, a second mounting flange parallel to and vertically offset from the first mounting flange, and a generally circular differential shaft bushing holder portion with a central axis transverse to the first and second mounting flanges. The mount also includes a first transition integrally formed with, and between, the first mounting flange and the receiver portion, a notch defined between the first mounting flange and the first transition, and a second transition integrally formed with, and between, the second mounting flange and the receiver portion. When an axial force is applied to the bushing holder portion in excess of a threshold value, either the first transition or the first mounting flange fracture and either the second transition or the second mounting flange fracture, thus, allowing the bushing holder portion to be displaced apart from the first mounting flange and second mounting flange.

19 Claims, 11 Drawing Sheets

Fig. 16B

FRANGIBLE MOUNT FOR A VEHICLE DIFFERENTIAL

BACKGROUND

A vehicle differential is supported on the vehicle's rear sub-frame which, in turn, is mounted to the body of the vehicle. Specifically, shafts on the differential fit into mounts supported on the sub-frame. When the vehicle is involved in an accident such that the differential is displaced (typically a frontal impact), it is desirable that the differential is separated from the mounts to avoid impact force being transmitted through the differential to vital vehicle components where significant damage can be caused. It is desirable to have the differential rotate downward after separation from the mounts and away from other vehicle components that could otherwise be damaged.

Figure 1:
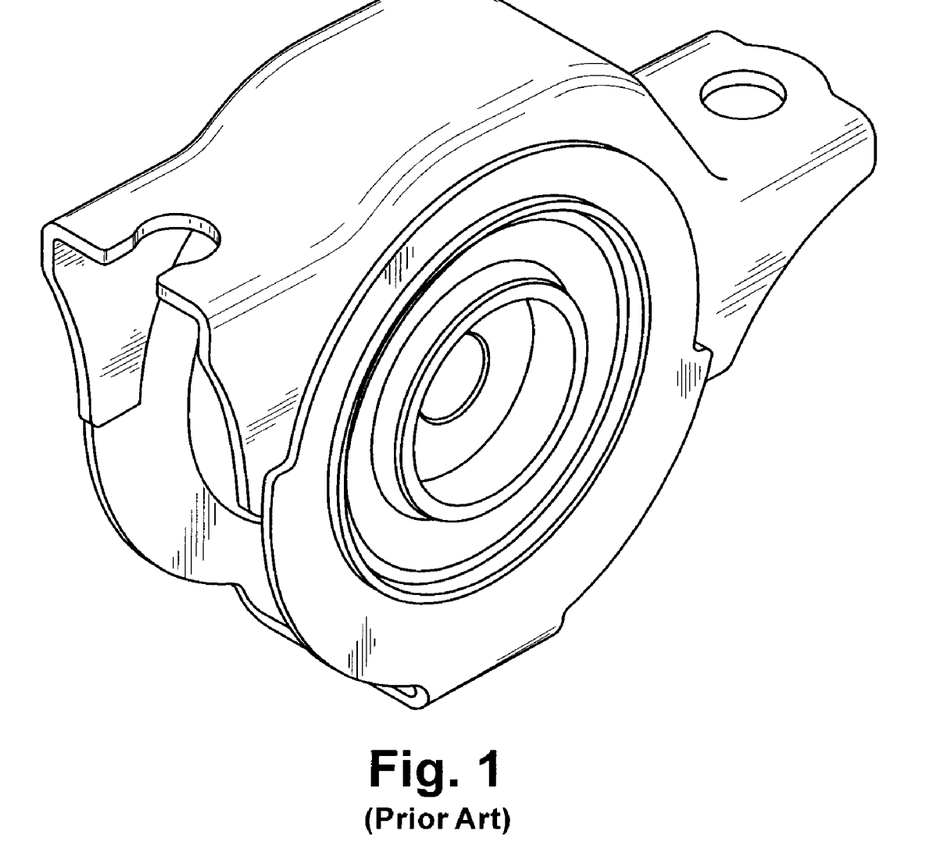
FIG. 1 is a perspective view of a differential mount of the prior art.

In the art, as shown if FIG. 1, metal mounts are known that include an outer metal housing member and an inner ring member separated by a rubber bushing. When a certain amount of force is applied to the metal mount via movement of a differential support shaft held in the inner ring member, in an axial direction, the inner ring member is forced out of the outer housing member through failure of the bushing and the differential is effectively separated from the vehicle sub-frame so significant damage to other vehicle components is avoided. However, the differential shafts must be moved a distance equivalent to the width of the outer housing in order to have sufficient clearance from the mounts to separate.

In more compact vehicles, it is desirable for the differential to separate from its mount(s) at much lower force thresholds, i.e. shorter displacements of the differential support shafts. The known metal mounts cannot be adjusted to provide separation of the inner ring and outer housing at such a lower force threshold.

SUMMARY

The present apparatus is directed to an improved vehicle differential frangible mount that fails at a lower force than mounts currently used in the art. The mount includes two mounting flanges that each become separated from the remainder of the mount at approximately an equivalent force threshold.

The differential mount includes a generally round bushing holder portion that supports a bushing that in turn supports a differential support shaft. A first transition is integrally formed with and between the first mounting flange and the bushing holder portion. A second transition is integrally formed with and between the second mounting flange and the bushing holder portion.

Different embodiments of the apparatus are briefly summarized below and described in more detail within the Detailed Description.

In a first embodiment, a notch is defined at least between the first mounting flange and the first transition. When force is applied above a threshold value, either the first mounting flange or the first transition fractures in an area adjacent to the notch. A second notch can be provided between the second mounting flange and the second transition to facilitate fracture in this second region. However, after one mounting flange fractures, the full force concentration on the remaining mounting flange (even without a notch) will cause it to fracture almost immediately after fracture of the first mounting flange.

In a second embodiment, a lateral position where an upper portion of a second transition meets the second mounting flange is offset from where a lower portion of the second transition meets the second mounting flange. As a result, when crash force is applied, a torque is provided that causes the breakage of the mounting flange. In a variation of this embodiment, an end where the upper portion of the second transition meets the second mounting flange, or a position close to the second mounting flange, is truncated in order to move the break point closer to the bushing holder portion. The lower portion of the second transition may be similarly truncated.

In a third embodiment, the area moments of inertia of the first and second transitions are controlled to provide proper breakage. Specifically, an approximate 52 percent reduction in the area moment of inertia is provided approximately between the junction of the first transition and first mounting flange to a desired break point. Additionally, an approximate 41 percent reduction in the area moment of inertia is provided from approximately the junction of the second transition and second mounting flange to a break point of the second transition.

These and other aspects are herein described in particularized detail with reference to the accompanying figures.

DETAILED DESCRIPTION

Figure 3:
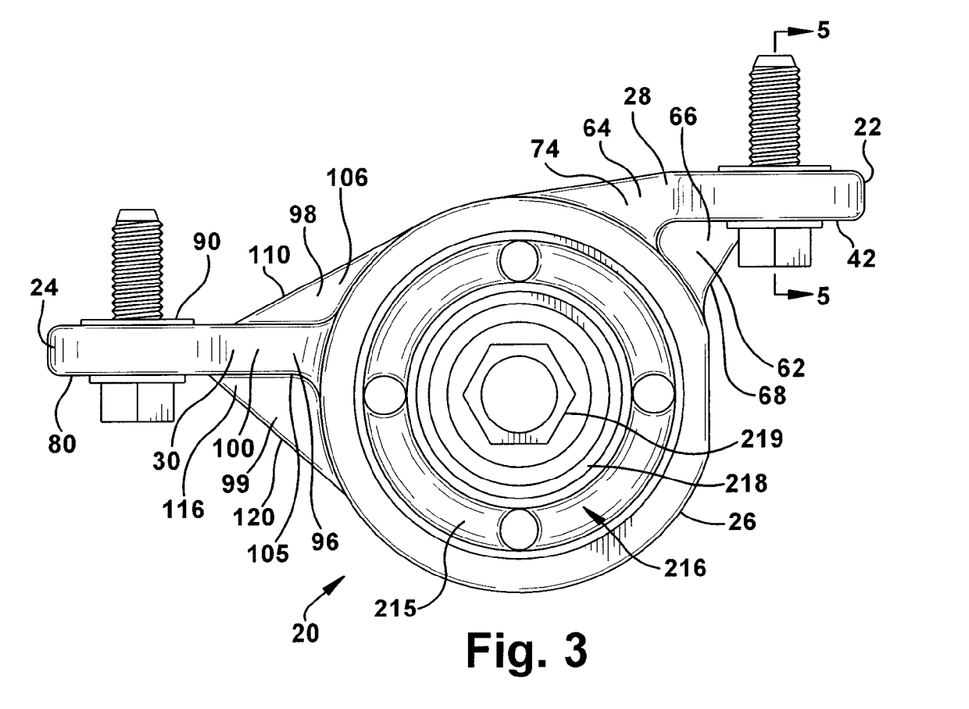
FIG. 3 is a front view of the mount of FIG. 2.

Referring to the drawings, particularly FIG. 3, a differential mount 20 is illustrated. The mount 20 includes a first mounting flange 22, a second mounting flange 24, a bushing holder 26, a first transition 28 between the first flange 22 and bushing holder 26 and a second transition 30 between the second flange 24 and bushing holder 26. The mount 20 is frangible and breaks, generally simultaneously, at two positions near a threshold force value, around 7 kN. As a result, the vehicle's differential becomes fully detached from its front mounts and is allowed to rotate downward, preventing the transfer of significant force of a vehicle collision to the rest of the vehicle. The differential mount 20 is shown in a right hand version in FIG. 4, suitable for mounting on the right hand (passenger) side of the vehicle. By reversing the position of the mounting flanges and transitions with respect to the bushing holder, a left hand version of the differential mount is provided for use on the left hand (drivers) side of the vehicle.

Figure 2:
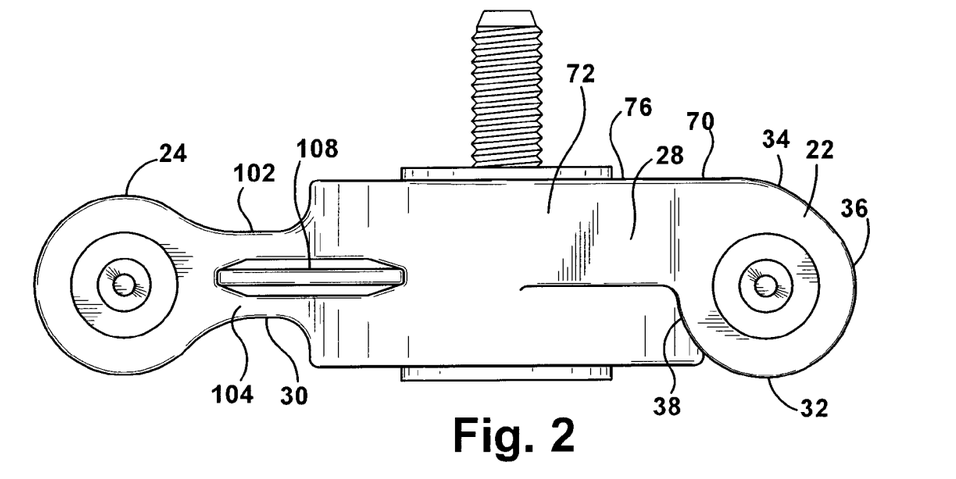
FIG. 2 is a top view of the differential mount of one embodiment, right hand version.
Figures 4, 5:
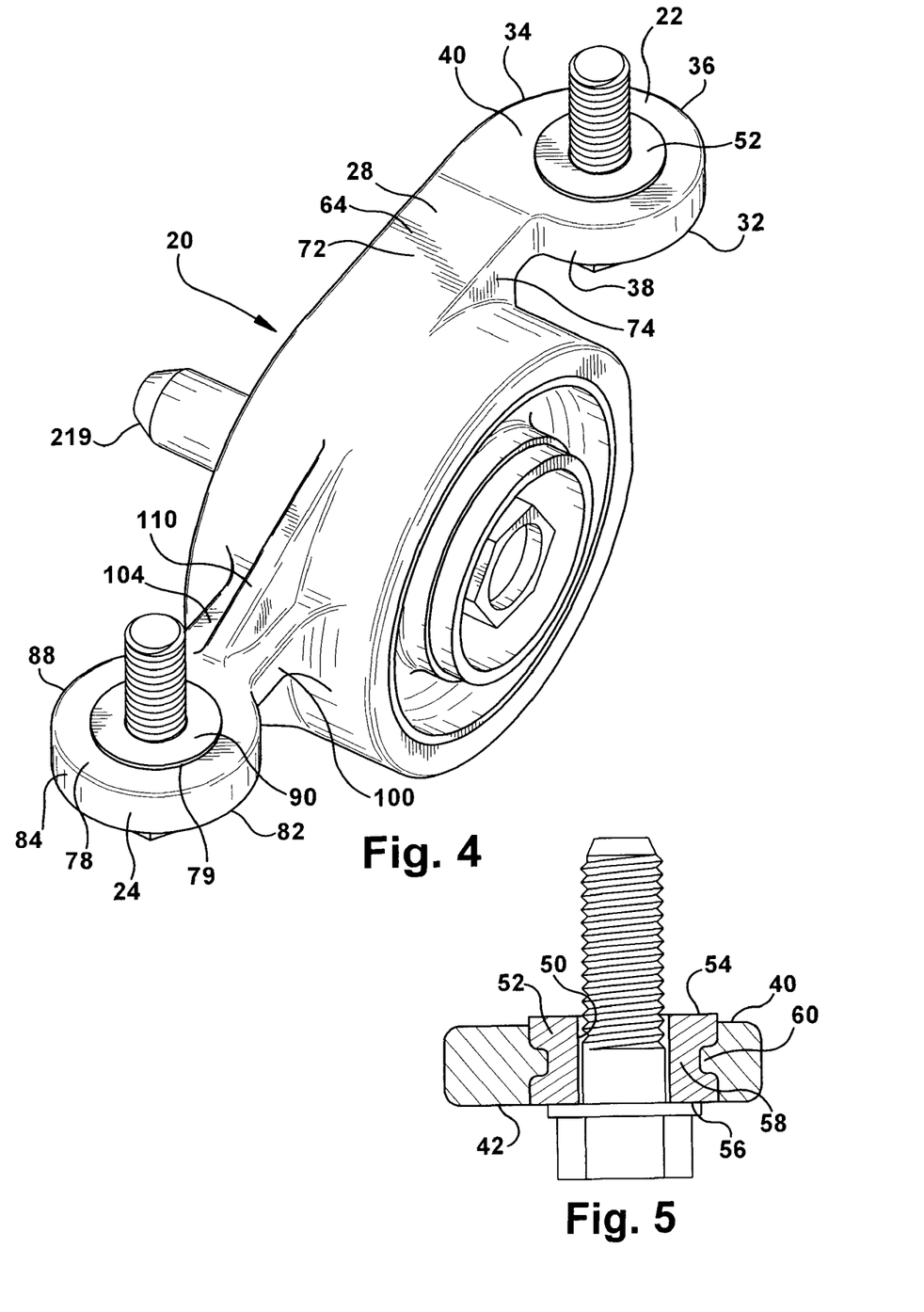
FIG. 4 is a perspective view of the mount of FIG. 2.
FIG. 5 is a cross-sectional view of a mounting flange of a mount of FIG. 2.

Referring to FIGS. 2-4, a first embodiment of the mount is shown. The trailing surface 34 of the first mounting flange 22 is opposite the leading surface 32. The trailing surface 34 is arcuate and merges into the trailing surface of the first transition 28. The first side surface 36 is also arcuate and opposite an arcuate second side surface 38. The second side surface 38 is short compared to the first side surface 36 and extends from the leading surface 32 to the first transition 28.

The first transition 28 includes a first portion 62 and a second portion 64. The first portion 62 is generally perpendicular to the first mounting flange 22. The first portion 62 includes a generally flat leading surface 66 and a side surface 68 that extends at an angle, offset from vertical, from the generally circular bushing holder 26 to the bottom surface 42 of the first mounting flange 22. The first portion 62 also includes a trailing surface 70 that is flush with the trailing surface of the bushing holder 26. At its top, the first portion 62 merges into the second portion 64 of the first transition 28.

The second portion 64 of the first transition 28 includes a top surface 72, a leading surface 74 and a trailing surface 76. The top surface 72 is generally rectangular and generally slopes down from the top surface 40 of the first mounting flange 22 to the bushing holder 26. The trailing surface 76 is flush and integrally formed with the trailing surface 70 of the first portion 62 of the transition 28. The leading surface 74 is generally flat and expands in surface area from a junction with the first mounting flange 22 to the bushing holder 26. The distance between the leading 74 and trailing surfaces 76 of the first transition 28 is smaller than the distance between the leading 32 and trailing surfaces 34 of the first mounting flange 22.

Referring to FIGS. 3 and 5, the first mounting flange 22 defines an aperture 50 extending from the top surface 40 to the bottom surface 42. The aperture 50 is located generally near the center of the mounting flange 22. A steel collar 52 is fitted inside of the aperture 50. The steel collar 52 includes first and second ends 54 and 56 that have a larger diameter than a portion 58 of the collar therebetween. The steel collar 52 is held in place by the material of the mount which is molded in place around the steel collar 52. Within the portion 58 between the ends, the steel collar includes a small notch 60 of reduced diameter into which the material of the mount flows during molding.

Referring back to FIGS. 2-4, the second mounting flange 24 is horizontal and offset vertically from the first mounting flange 22. The second mounting flange 24 is located generally on the opposite side of the bushing holder 26 from the first mounting flange 22. The second mounting flange 24 includes a top surface 78, bottom surface 80, leading surface 82, outer side surface 84, and trailing surface 88. The leading surface 82 of the second mounting flange 24 is directed toward the front of the vehicle. The top surface 78 and bottom surface 80 have generally the same size and shape and a surface area that exceeds that of either the leading surface 82, trailing surface 88, or side surface 84. The second mounting flange 24 has, in general in this embodiment, a round plate shape. The top surface 78 defines an aperture 79 therein, generally at the center that extends from the top surface 78 to the bottom surface 80. The aperture 79 within the second mounting flange 24 includes a steel collar 90 that is similar to the collar 52 within the aperture in the first mounting flange 22.

The leading surface 82, side surface 84, and trailing surface 88 are arcuate and the side surface 84 connects to both the leading surface 82 and trailing surface 88. The leading surface 82 and trailing surface 86, opposite the side surface 84, taper into the second transition 30.

The second transition 30 includes a first, middle, portion 96, a second, upper, portion 98, and a third, lower, portion 99. The first portion 96 includes a leading surface 100, a trailing surface 102, a top surface 104, and a bottom surface 105. The leading surface 100 is generally flat and tapers outward slightly where it joins the bushing holder 26. The top surface 104 is generally flat and also tapers outward slightly where it joins the bushing holder 26. The trailing surface 102 has a shape that is the same as the leading surface 100. The bottom surface 105 has a shape that is the same as the top surface 104.

The second, upper, portion 98 of the second transition 30 is generally triangular or wedge shaped and includes a leading surface 106, a trailing surface 108 and a top surface 110. The distance between the leading surface 106 and the trailing surface 108 of the second portion 98 is approximately one half as long as the distance between the leading surface 100 and trailing surface 102 of the first portion of the second transition. The top surface 110 of the second portion 98 extends generally tangentially from the circular bushing holder 26 into the top surface of the second mounting flange 24. With respect to the top surface 104 of the first portion 96 of the second transition 30, the second portion 98 bisects the top surface 104.

The third, lower, portion 99 of the second transition 30 is also generally triangular or wedge shaped and includes a leading surface 116, a trailing surface and a bottom surface 120. The distance between the leading surface 116 and the trailing surface of the third portion 99 of the second transition 30 is approximately one half as long as the distance between the leading surface 100 and trailing surface 102 of the first portion 96 of the second transition 30. The bottom surface 120 of the third portion 99 extends generally tangentially from the circular bushing holder 26 into the bottom surface of the second mounting flange 24. With respect to the bottom surface 105 of the first portion 96 of the second transition 30, the third portion 99 bisects this bottom surface 105.

The generally circular bushing holder 26 is formed from a resinous material (fiberglass reinforced nylon) and is bonded to the bushing 216. The bushing 216 includes an inner circular collar 218 and a circular rib 215. The circular rib 215 is rubber and provides dynamic movement control and vibration isolation. The inner collar 218 provides a rigid connection to the differential case. A bolt 219 is used to secure the shaft from the differential case, shown for example in FIG. 10.

The first mounting flange 22, second mounting flange 24, first transition 28, second transition 30 and outer collar 118 of the receiver portion 26 are formed from a common molded piece of fiberglass reinforced nylon.

Figure 6:
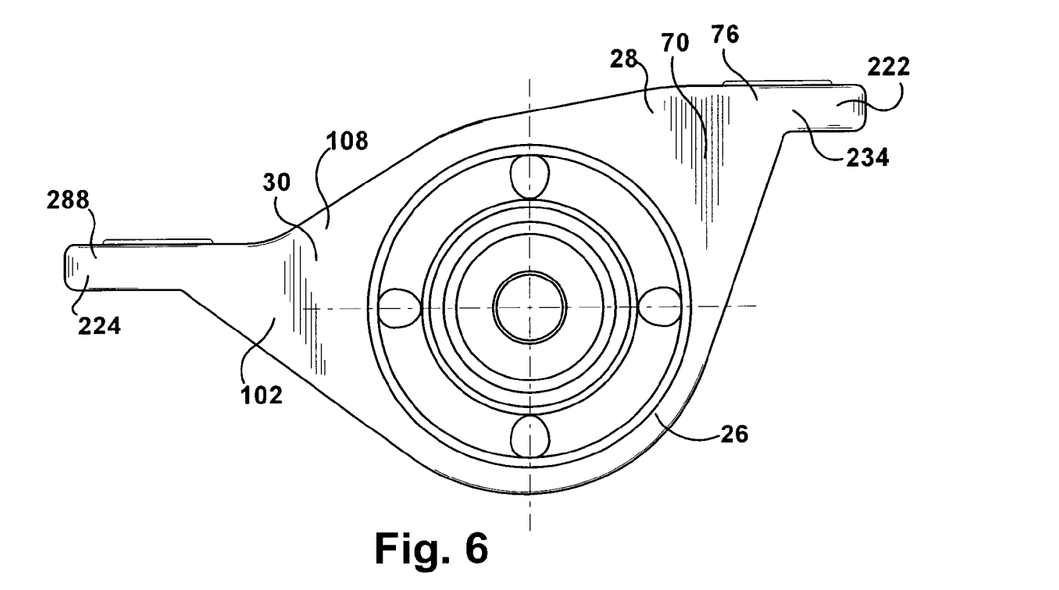
FIG. 6 is a rear elevational view of the mount of FIG. 2.
Figure 7:
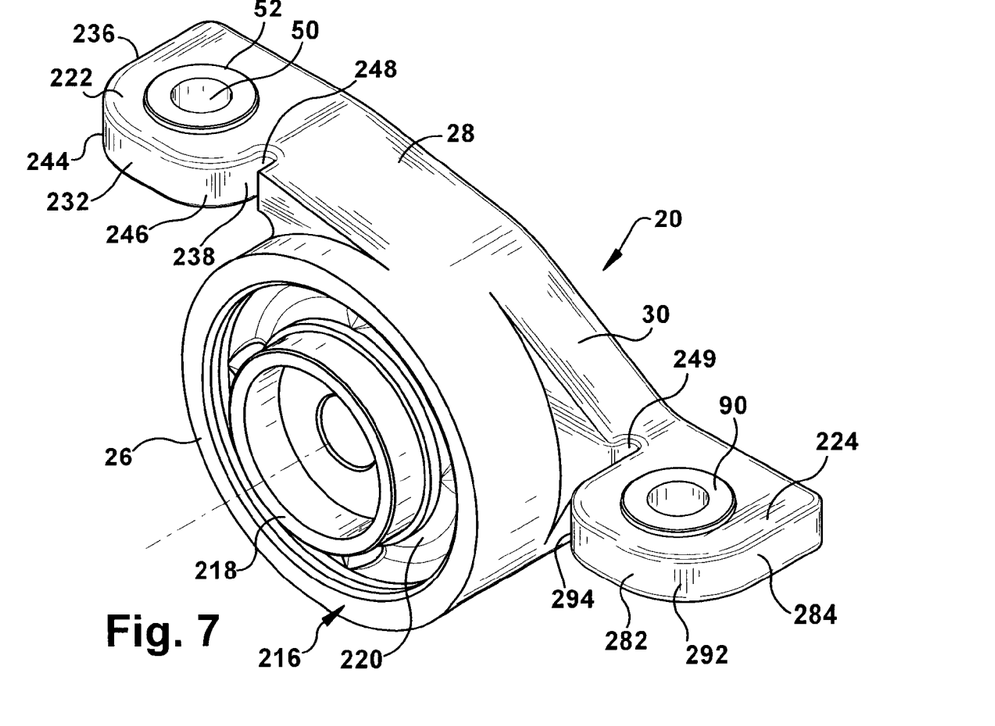
FIG. 7 is a perspective view of an alternative embodiment of the differential mount.

Referring to FIGS. 6-7, an alternate shape of the mount 20 is shown. The first mounting flange 222 of the frangible mount 20 is generally rectangular. The leading surface is rounded at first and second edges 244 and 246. The second edge 246 of the leading surface 232 is at the junction between the leading surface 232 and the short second side surface 238 that defines part of a notch 248 between the first mounting flange and transition. The first mounting flange 222 also has a trailing surface 234, and outside surface 236.

The second mounting flange 224 also has a leading surface 282 that is generally rectangular and includes two rounded edges 292 and 294. The trailing surface 288 and outer side surface 284 are generally rectangular as well.

Figure 9:
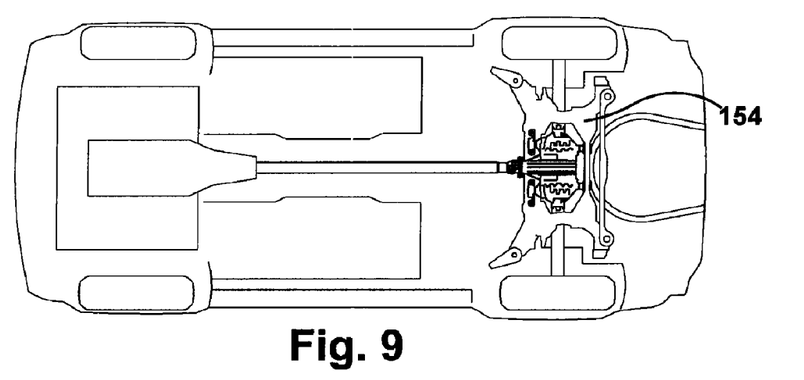
FIG. 9 is a bottom view of a vehicle showing the vehicle's rear sub-frame and differential.
Figure 10:
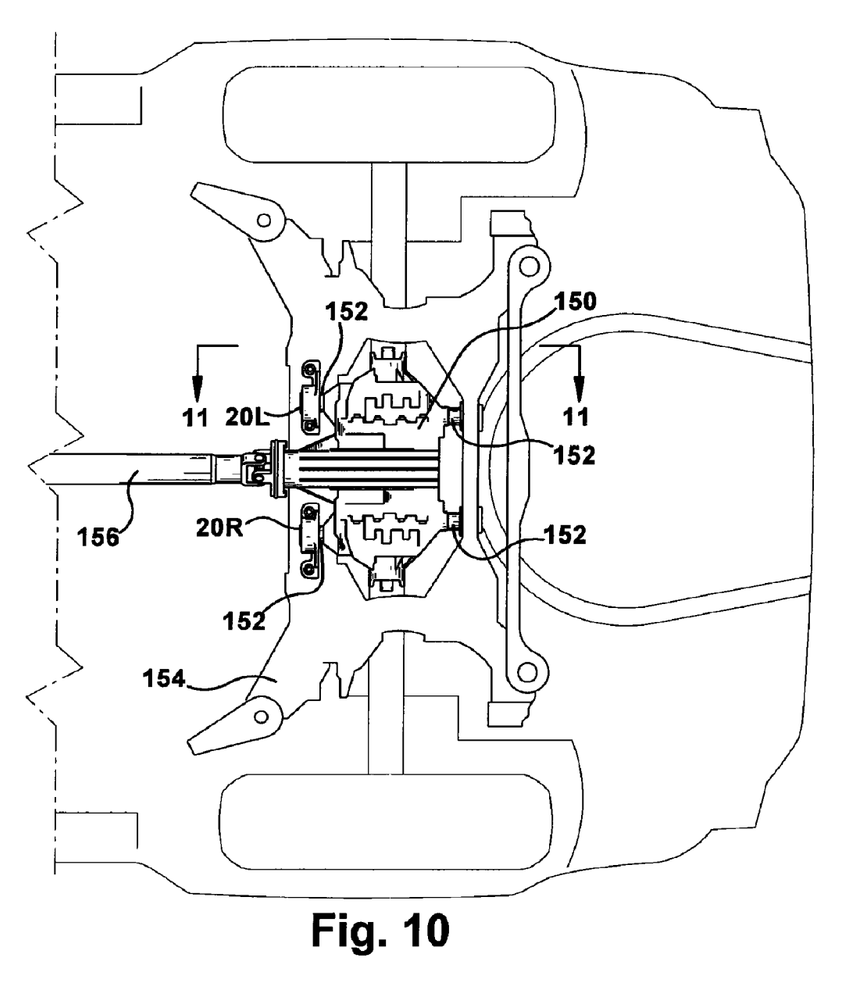
FIG. 10 is a bottom view of a vehicle showing the differential supported on the rear sub-frame.
Figure 11:
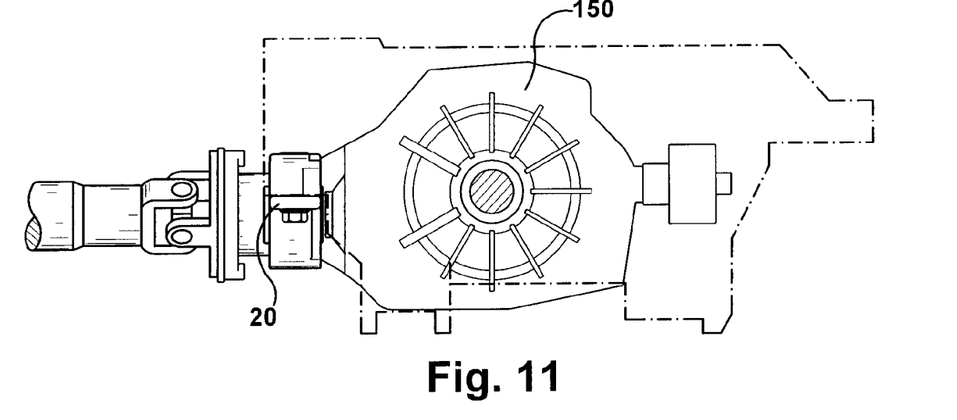
FIG. 11 is a side elevational view of the vehicle differential prior to a collision.

Referring to FIGS. 9-10, the differential 150 is shown and includes four mounting bosses or shafts 152. Each boss or shaft supports a bushing that fits into a mount on the vehicle's rear sub-frame 154 by a rubber bushing. Two mounts, that are of a different type, are used and are attached to the rear portion of the sub-frame. Specifically, an outer ring on such a mount is press fit into an aperture in the vehicle's rear sub-frame 154. The mount also includes an inner ring and a bushing between the outer and inner rings. Two mounts 20 of the apparatus described herein are attached to the front portion of the sub-frame 154. One left-hand type of mount 20L is used on one side of the vehicle drive-shaft 156, wherein the first mounting flange is toward the inboard side of the vehicle and the second mounting flange is toward the outboard side of the vehicle. A right-hand type of mount 20R is used on the opposite side of the vehicle prop-shaft 156, and the positions of the first and second mounting flanges are reversed.

Referring to FIGS. 3 and 8-12, during normal operation the mount 20 is loaded repetitively in a vertical direction (durability loads) due to the vehicle encountering bumps and through normal acceleration and deceleration. The glass reinforced nylon mount is designed not to be structurally affected by loads in this direction. However, when the vehicle is involved in a frontal crash, a load is applied in a longitudinal direction (braking load). When the load applied in this direction reaches approximately 7 kN, both mounting flanges 222 (22), 224 (24) become separated from the bushing holder 26, almost simultaneously. To obtain the required force for fracture, approximately 10 mm of displacement occurs within the inner collars 218. Specifically, each mount 20 fractures on one side either within the structure of the first mounting flange 222 (22) or the first transition 28. On the other side, the mount 20 fractures either within the structure of the second mounting flange 224 (24) or the second transition 30.

Figure 8:
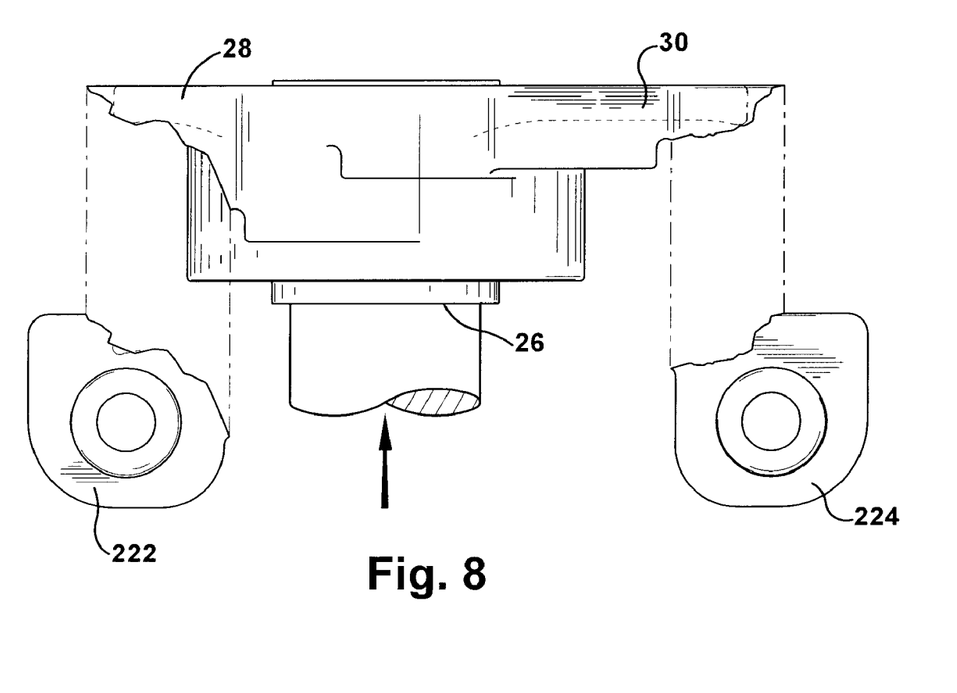
FIG. 8 is a top view of the mount of FIG. 7 once fracture has occurred.
Figure 12:
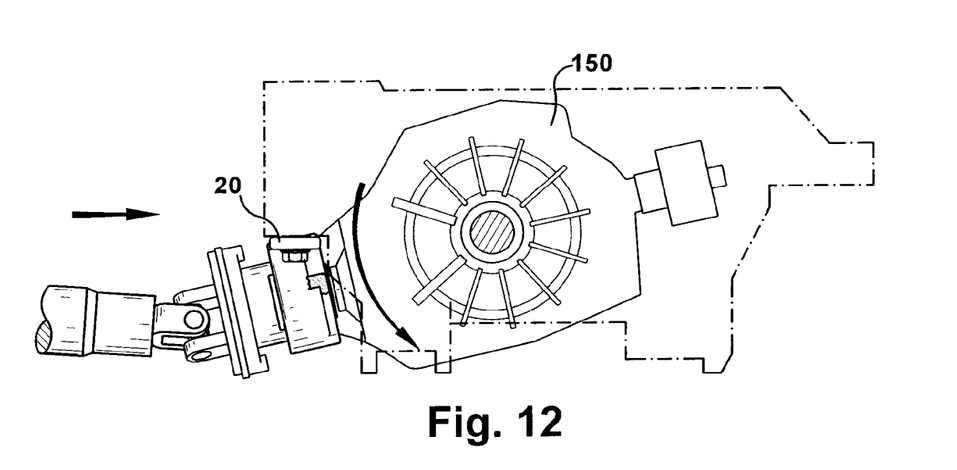
FIG. 12 is a side elevational view of the vehicle during a collision.

During the crash, force is applied in the direction of the straight arrows shown in FIGS. 8 and 12, and within the mounts on the rear portion of the rear sub-frame, an inner collar is forced out from the circular rib, but the differential 150 is still supported on the sub-frame. Force applied to the mounts 20, located on the front portion of the rear sub-frame cause the mounts to fracture, as shown in FIG. 8. After the mounts 20 fracture, the differential 150 is free to rotate downward, as shown in FIG. 12. The top rear portion of the differential 150 makes contact with the top of the sub-frame. Crash energy is not forced into the body of the vehicle, but instead into movement of the differential 150.

If both fractures are not nearly simultaneous, the second, subsequent, fracture will soon follow as all of the crash load gets transmitted through only one side of the mount.

It is critical that the mount fail at a predetermined loading, and in some instances critical that both mounting flanges break almost simultaneously. Described below are important structural relationships of components of the mount that allow failure to occur at the desired conditions. These structural relationships may be used alone or together to achieve the desired result.

Within the description of the embodiment structure of the mount in FIG. 7, a notch 248 between the first mounting flange 222 and first transition 28 is described. A similar notch 249 (shown only in FIG. 7) may be placed between the second mounting flange 224 and the second transition 30. When a longitudinal (braking) load is applied during vehicle collision, stress is concentrated at the notch(es) and failure occurs in the mounting flange, adjacent to the notch.

Figure 13A:
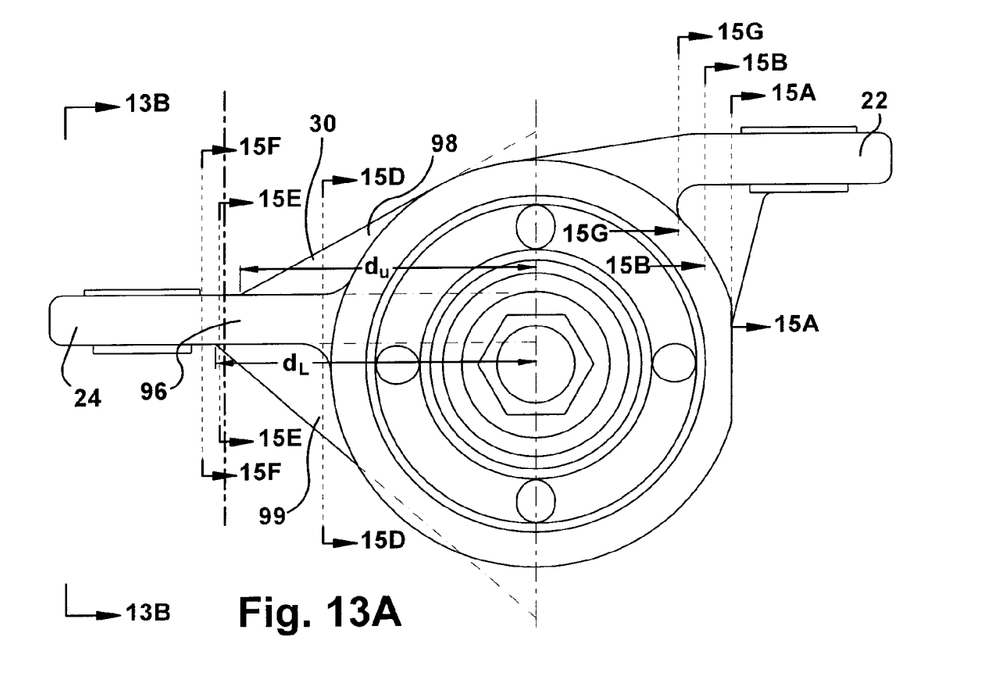
FIG. 13A is a front elevational view of the mount of FIG. 3 showing critical dimensions.

In a second structural relationship embodiment, referring to FIG. 13A, the position where the second portion 98 of the second transition 30 intersects the second mounting flange 24 is offset laterally from the position where the third portion 99 of the second transition 30 intersects the second mounting flange 24. The offset is characterized by measuring the horizontal distance from the intersection points to a vertical line passing through the center of the bushing holder 26. The distance from the line to the first intersection point is $d_U$ and the distance from the line to the second intersection point is $d_L$. To provide a downward rotation cracking mode needed to achieve desired failure, $(d_L-d_U)/d_L$ is between 80% and 98%.

In one variation of this structural relationship, shown in FIG. 13A, the top surface of the second portion 98 of the second transition 30 has a constant slope in the area adjacent to the intersection point with the second mounting flange 24. Similarly, the bottom surface of the third portion 99 of the second transition 30 has a constant slope in the area adjacent to the intersection point with the second mounting flange 24.

Figure 14:
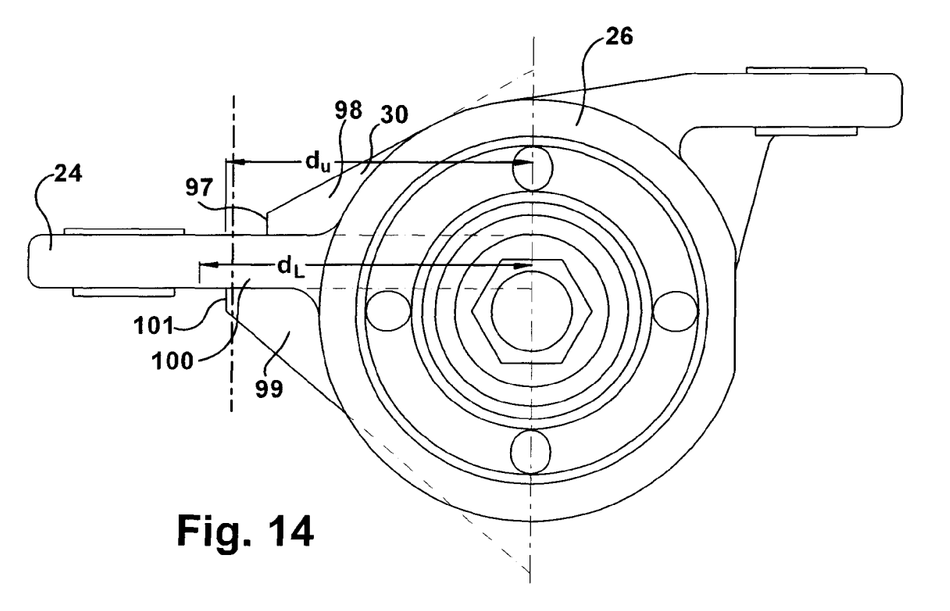
FIG. 14 is a front view of a variation of the mount of FIG. 13A showing critical dimensions.

In another variation of this structural relationship, shown in FIG. 14, the slope of the top surface of the second portion 98 is truncated adjacent to the intersection point with the second mounting flange 24. At the truncation point, the truncation defines a vertical face 97 on the side of the second portion 98. Similarly, the slope of the bottom surface of the third portion 99 is truncated adjacent to the intersection point with the second mounting flange 24. This truncation also defines a vertical face 101 on the side of the third portion. These truncations result in moving the breaking point of the second transition 30 closer to the bushing holder 26. The intersection point may be shifted enough so that the second portion 98 and/or third party 99 intersects only the first portion 100 of the transition as opposed to the mounting flange 24.

Figure 13B:
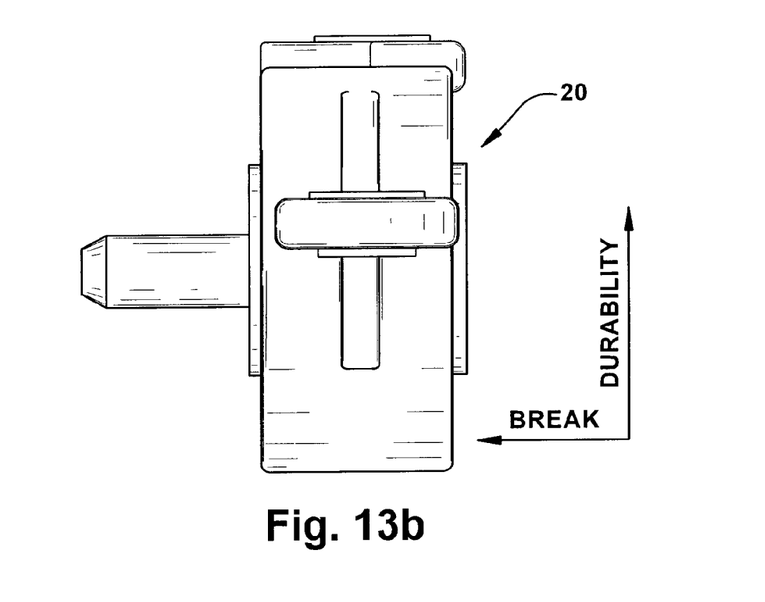
FIG. 13B is a side elevational view of the mount of FIG. 13A, also showing loading axes.
Figure 15A:
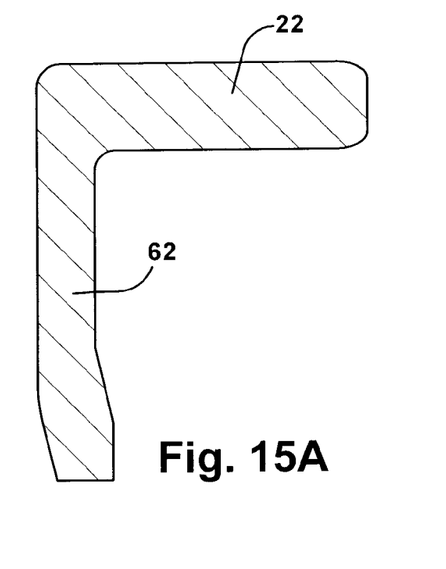
FIG. 15A is a first cross sectional view of the mount of FIG. 13A.
Figure 15B:
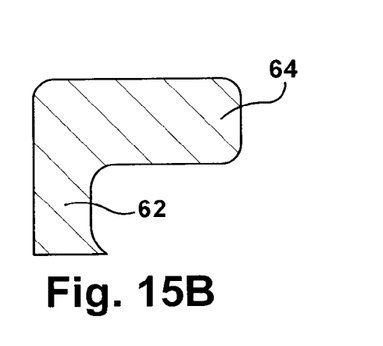
FIG. 15B is a second cross sectional view of the mount of FIG. 13A.
Figure 15C:
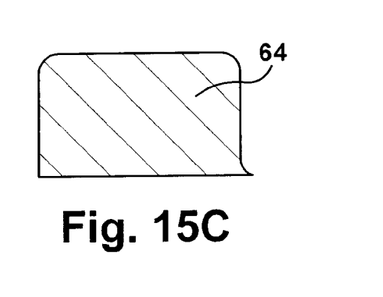
FIG. 15C is a third cross sectional view of the mount of FIG. 13A.
Figure 15D:
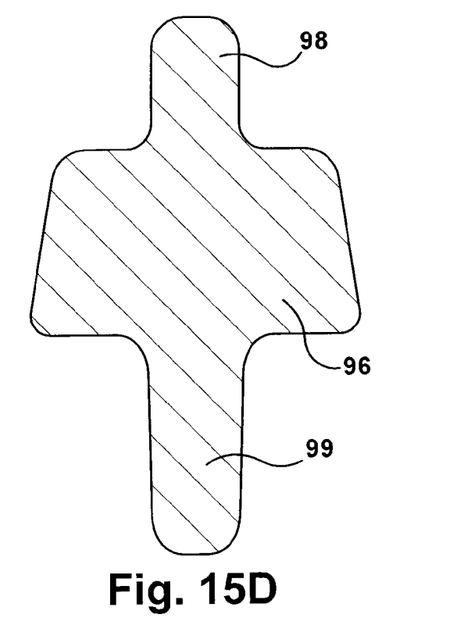
FIG. 15D is a fourth cross sectional view of the mount of FIG. 13A.
Figure 15E:
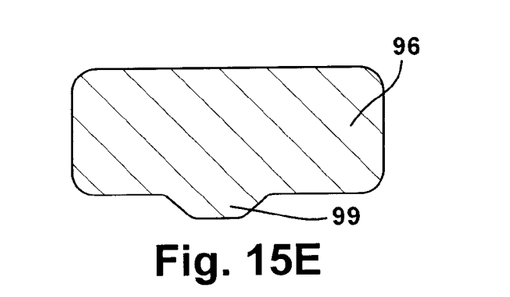
FIG. 15E is a fifth cross sectional view of the mount of FIG. 13A.
Figure 15F:
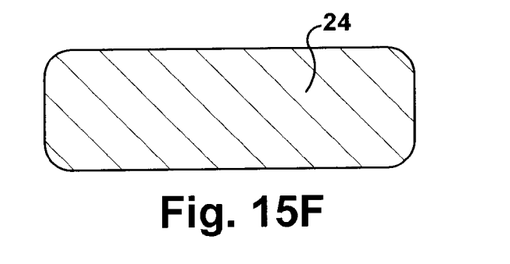
FIG. 15F is a sixth cross sectional view of the mount of FIG. 13A.

In a third structural relationship embodiment, again referring to FIGS. 13A, 13B and 15A-F the relative area moments of inertia (also known in the art as second moment of inertia) between different points of the mount guarantee a desired failure mode. A vertical axis is referred to as the durability axis because when load is applied in a vertical direction, the mount is not meant to fail, but instead support the load, remaining durable. A longitudinal axis is referred to as the break axis. As is known to those in the art, the area moment of inertia is a property of a shape that is used to predict its resistance to bending and deflection. By designing to have a specific reduction in the area moment of inertia between the point where a transition meets the mounting flange and a break point, breakage at a desired force is guaranteed. Referring to FIGS. 13A and 13B, the mount is shown with a number of cross sections defined by the cross sectional shapes shown in FIGS. 15A-F. FIG. 15A shows the cross section of the mount 20 at a first mounting flange collar point which includes the first mounting flange 22 and the first portion 62 of the first transition 28 in an L-shape. FIG. 15B shows the cross section of the mount 20 at a desired break point which includes part of the first portion 62 of the first transition 28 and part of the second portion 64 of the transition 28, also in an L-shape. FIG. 15C shows the cross section of the mount 20, specifically the second portion 64 of the transition 28 at a point adjacent to the junction with the bushing holder 26. FIG. 15D shows the cross section of the mount at a position where the second transition 30 meets the bushing holder 26, specifically showing the first portion 96, second portion 98 and third portion 99 of the transition 30. FIG. 15E shows the cross section of the mount 20 at a desired break position of the second transition 30 adjacent to the second mounting flange 24, specifically showing the first portion 96 and third portion 99 of the transition 30. FIG. 15F shows the cross section of the mount 20 at the second mounting flange 24.

Figure 16A:
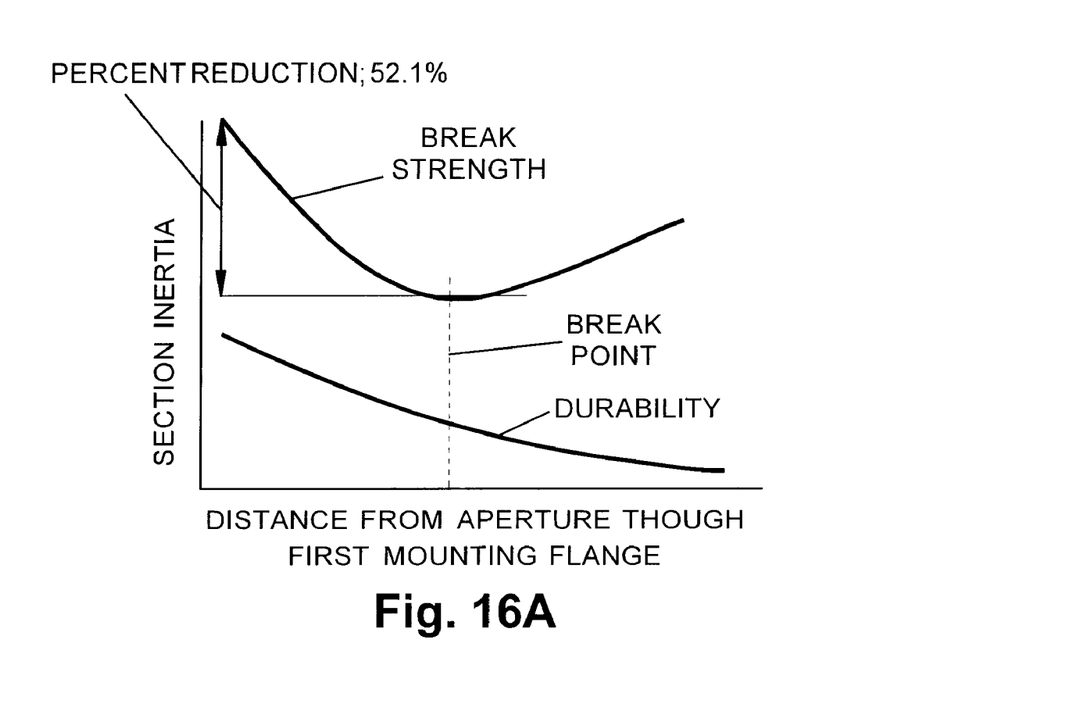
FIG. 16A is a graph of area moment of inertia on an inboard side of the mount of FIG. 13A.

FIG. 16A graphically illustrates the area moment of inertia along both the durability axis and brake axis (axes defined in FIG. 13B) as one moves from a collar point, intersecting the first mount 22, toward a position adjacent the bushing holder 26. The amount of reduction in area moment of inertia is illustrated as well as the break point. On the inboard side of the mount (the side closes to the centerline of the vehicle) at least about a 52 percent reduction of area moment of inertia from the collar point to the desired break point is required to have breakage at the desired threshold of force. Here, first mounting flange 22 is considered the inboard mounting flange.

Figure 16B:
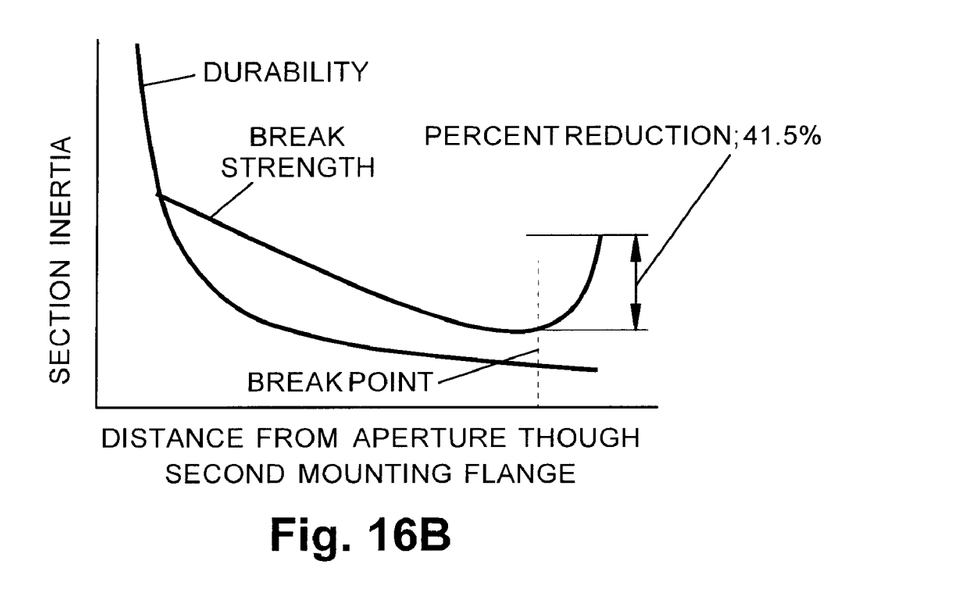
FIG. 16B is a graph of area moment of inertia on an outboard side of the mount of FIG. 13A.

FIG. 16B graphically illustrates, on the outboard side of the mount 20, the area moment of inertia along both the durability axis and brake axis as one moves from a collar point, intersecting the mounting flange 24, toward a position adjacent the bushing holder 26. The amount of reduction in area moment of inertia is illustrated as well as the break point. On the outboard side at least about a 41.5 percent reduction of area moment of inertia from the collar point to the desired break point is required to have breakage at the desired threshold of force. The mounting flange 24 is configured farthest from the center of the vehicle and is the considered the outboard mounting flange.

In another embodiment, the area moment of inertia along the durability axis at the following points is as follows: AA=72,364 mm$^4$; BB=50,815 mm$^4$; CC=10,463 mm$^4$; DD=29,725 mm$^4$; EE=1,528 mm$^4$; FF=1,744 mm$^4$. The area moment of inertia along the break axis at the following points is as follows: AA=209,205 mm$^4$; BB=108,869 mm$^4$; CC=147,835 mm$^4$; DD=11,659 mm$^4$; EE=7,366 mm$^4$; FF=17,730 mm$^4$.

The present apparatus is an improvement over the prior art in that both sides of the mount fracture at approximately the same force threshold. Thus, full detachment is achieved. Additionally, as compared to the prior art, less displacement of the differential is required before separation occurs (displacement of a differential is proportional to the force applied thereto). Thus, the mount may be used in a vehicle where less room for displacement is available. Due to the materials of construction, the failure force threshold is less apt to change over time as the glass filled nylon construction is less susceptible to tolerance variation and corrosion than metal construction.

Although the apparatus has been shown and described with reference to certain preferred and alternate embodiments, the apparatus and method is not limited to these specific embodiments. Minor variations and insubstantial differences in the various combinations of materials and methods of application may occur to those of ordinary skill in the art while remaining within the scope of the invention as claimed and equivalents.

What is claimed is:

1. A frangible mount for supporting a vehicle differential, the differential including a support shaft with a bushing thereon, and the mount comprising:
   a first horizontal mounting flange;
   a second horizontal mounting flange parallel to and vertically offset from the first mounting flange;
   a generally circular bushing holder located between the first and second mounting flanges;
   a first transition integrally formed with, and between, the first mounting flange and the bushing holder;
   a notch defined between the first mounting flange and the first transition; and
   a second transition integrally formed with, and between the second mounting flange and the bushing holder;
   a second notch defined between the second mounting flange and the second transition:
   whereby during a collision, an axial force is applied from the vehicle differential's shaft and bushing to the bushing holder in excess of a threshold value, causing either the first transition or the first mounting flange to fracture adjacent to the notch and either the second transition or the second mounting flange to fracture almost simultaneously with the first transition or first mounting flange, thus, allowing the bushing holder to be displaced apart from the first mounting flange and second mounting flange.

2. The frangible mount of claim 1, further including a first steel collar held within an aperture defined by the first mounting flange and a second steel collar held within an aperture defined by the second mounting flange.

3. The frangible mount of claim 1, wherein the notch defined between the first mounting flange and the first transition has a channel shape with an arcuate end.

4. A frangible mount for supporting a vehicle differential, the differential including a support shaft with a bushing thereon, and the mount comprising:
   a first horizontal mounting flange having a top surface and a bottom surface;
   a second horizontal mounting flange parallel to and vertically offset from the first mounting flange;
   a generally circular bushing holder located between the first and second mounting flanges;
   a first transition integrally formed with, and between, the first mounting flange and the bushing holder portion;
   a second transition integrally formed with, and between, the second mounting flange and the bushing holder, the second transition including:
     a first generally triangular solid portion having an external surface that merges with the bushing holder at one end and the top surface of the second mounting flange at the opposite end;
     a second generally triangular solid portion having an external surface that merges with the bushing holder at one end and the bottom surface of the second mounting flange at the opposite end;
     wherein the horizontal distance from a vertical line through the center of the bushing holder to the junction of the first triangular solid portion's external surface and second mounting flange is between 2 and 20 percent less than the
     horizontal distance from the same vertical line to the junction of the second triangular solid portion's external surface and the second mounting flange;
   whereby during a collision, an axial force is applied from the vehicle differential's support shaft to the bushing holder in excess of a threshold value, causing either the second transition or the second mounting flange to fracture and either the first transition or the first mounting flange to fracture, thus, allowing the bushing holder portion to be displaced apart from the first mounting flange and second mounting flange.

5. The frangible mount of claim 4, wherein the external surface of the first generally triangular solid portion has a constant slope along its top surface.

6. The frangible mount of claim 4, further including a horizontal solid portion located between the first and second generally triangular solid portions.

7. The frangible mount of claim 4, wherein the bottom surface of the second triangular solid has a constant slope along its length.

8. A frangible mount for supporting a vehicle differential, the differential including a support shaft with a bushing thereon, and the mount comprising:
   a first horizontal mounting flange having a top surface and a bottom surface;
   a second horizontal mounting flange parallel to and vertically offset from the first mounting flange;
   a generally circular bushing holder located between the first and second mounting flanges;
   a first transition integrally formed with, and between, the first mounting flange and the bushing holder portion;
   a second transition integrally formed with, and between, the second mounting flange and the bushing holder, the second transition including:
      a first generally triangular solid portion
      a second generally triangular solid portion;
      a rectangular solid portion having a top surface and a bottom surface and being located between the first generally triangular solid portion and the second generally triangular solid portion;
      wherein the first generally triangular solid portion has an external surface that merges with the bushing holder at one end and the top surface of the rectangular solid portion at the opposite end;
      wherein the second generally triangular solid portion has an external surface that merges with the bushing holder at one end and the bottom surface of the rectangular solid portion flange at the opposite end; and
      wherein the horizontal distance from a vertical line through the center of the bushing holder to the junction of the first triangular solid portion's external surface and top of the rectangular portion is between 2 and 20 percent less than the horizontal distance from the same vertical line to the junction of the second triangular solid portion's external surface and the bottom surface of the rectangular portion;
   whereby during a collision, an axial force is applied from the vehicle differential's support shaft to the bushing holder in excess of a threshold value, causing either the second transition or the second mounting flange to fracture and either the first transition or the first mounting flange to fracture, thus, allowing the bushing holder portion to be displaced apart from the first mounting flange and second mounting flange.

9. The frangible mount of claim 8, wherein the external surface of the first triangular solid is truncated at the junction with the solid rectangular portion such that the exterior surface includes a short vertical portion at the junction, whereby a fracture point is moved closer to the bushing holder.

10. The frangible mount of claim 8, wherein the external surface of the second triangular solid is truncated at the junction with the solid rectangular portion such that the exterior surface includes a short vertical portion at the junction, whereby a fracture point is moved closer to the bushing holder.

11. A frangible mount for supporting a vehicle differential, the differential including a support shaft with a bushing thereon, and the mount comprising:
    a first horizontal mounting flange with a mounting aperture;
    a second mounting flange with a mounting aperture, the mounting flange being parallel to and vertically offset from the first mounting flange;
    a generally circular bushing holder portion located between the first and second mounting flanges;
    a first transition integrally formed with, and between the first mounting flange and the bushing holder portion;
    a second transition integrally formed with, and between, the second mounting flange and the bushing holder, the second transition including:
       a first generally triangular solid having an external surface that merges with the bushing holder at one end and the second mounting flange at the opposite end; and;
       a generally rectangular solid section transverse to the triangular solid section;
    wherein:
       a vertical plane passing through the second mounting flange between the mounting aperture and a junction with the second transition defines a cross section with a first moment of inertia,
       a second vertical plane passing though the triangular solid and rectangular solid section that defines a cross section with a second area moment of inertia; and
       the second moment of inertia is at least 41 percent less than the first area moment of inertia;
    whereby during a collision an axial force is applied from the vehicle differential's support shaft to the bushing holder portion in excess of a threshold value, causing either the second transition or the second mounting flange to fracture, thus, allowing the bushing holder portion to be displaced apart from the first mounting flange and second mounting flange.

12. The frangible mount of claim 11, wherein the first transition includes:
    a generally triangular solid section;
    a generally rectangular solid section transverse to the triangular solid section of the first transition; and
    wherein:
       a vertical plane passing through the first mounting flange and the generally triangular section of the first transition defines a cross section with a third area moment of inertia; and
       a vertical plane passing through the generally triangular solid section and generally rectangular transverse solid section defines a fourth moment of inertia; and
    the fourth moment of inertia is at least 52 percent less than the third area moment of inertia.

13. The frangible mount of claim 12, wherein the vertical plane passing through the first mounting flange and the generally triangular section of the first transition defines a cross section having an L-shape.

14. The frangible mount of claim 12, wherein the vertical plane passing through the generally triangular solid and generally rectangular solid section of the second transition defines a cross section having a rectangular shape with a protrusion on a longer side.

15. The frangible mount of claim 12, wherein:
the first generally triangular portion merges with a top surface of the second mounting flange and
the second transition further comprises a second generally triangular solid portion having an external surface that merges with the bushing holder at one end and the bottom surface of the second mounting flange at the opposite end and
wherein the horizontal distance from a vertical line through the center of the bushing holder to the junction of the first triangular solid portion's external surface and the first mounting flange is between 2 and 20 percent less than the horizontal distance from the same vertical line to the junction of the second triangular solid portion's external surface and the second mounting flange.

16. The frangible mount of claim 15, wherein the external surface of the first triangular solid is truncated at the junction with the first mounting flange such that the edge includes a short vertical portion at the junction, whereby a fracture point is moved closer to the bushing holder.

17. The frangible mount of claim 16, wherein the external surface of the second triangular solid is truncated at the junction with the second mounting flange such that the edge includes a short vertical portion at the junction, whereby a fracture point is moved closer to the bushing holder.

18. The frangible mount of claim 12, wherein a notch is defined between the first mounting flange and the first transition.

19. The frangible mount of claim 18, wherein a second notch is defined between the second mounting flange and the second transition.

* * * * *